(12) United States Patent
Izumi et al.

(10) Patent No.: US 8,720,985 B2
(45) Date of Patent: May 13, 2014

(54) SIDE BODY STRUCTURE FOR VEHICLE

(71) Applicant: Honda Motor Co., Ltd., Tokyo (JP)

(72) Inventors: Yoshitaka Izumi, Wako (JP); Hitoshi Nunami, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/838,817

(22) Filed: Mar. 15, 2013

(65) Prior Publication Data

US 2013/0264840 A1 Oct. 10, 2013

(30) Foreign Application Priority Data

Apr. 5, 2012 (JP) ................................. 2012-086488

(51) Int. Cl.
*B62D 25/20* (2006.01)

(52) U.S. Cl.
USPC ...................................... 296/209; 296/187.12

(58) Field of Classification Search
USPC ............. 296/187.12, 193.05, 203.01, 203.03, 296/209
See application file for complete search history.

(56) References Cited

U.S. PATENT DOCUMENTS

| 5,207,475 | A | * | 5/1993 | Hellstrom | 296/187.12 |
| 6,053,564 | A | * | 4/2000 | Kamata et al. | 296/187.09 |
| 6,854,795 | B2 | * | 2/2005 | Yamazaki et al. | 296/209 |
| 6,951,366 | B2 | * | 10/2005 | Tomita | 296/187.08 |
| 7,963,588 | B2 | * | 6/2011 | Kanagai et al. | 296/187.12 |
| 8,118,355 | B2 | * | 2/2012 | Tamura et al. | 296/209 |
| 8,439,428 | B2 | * | 5/2013 | Imamura | 296/193.05 |
| 2010/0109385 | A1 | * | 5/2010 | Yamada et al. | 296/209 |
| 2012/0119546 | A1 | * | 5/2012 | Honda et al. | 296/203.01 |
| 2013/0313863 | A1 | * | 11/2013 | Yamaji et al. | 296/203.01 |

FOREIGN PATENT DOCUMENTS

JP  4438416 B2  3/2010

* cited by examiner

*Primary Examiner* — Glenn Dayoan
*Assistant Examiner* — Gregory Blankenship
(74) *Attorney, Agent, or Firm* — Westerman, Hattori, Daniels & Adrian, LLP

(57) ABSTRACT

A side body structure for a vehicle includes a side sill. The side sill includes a closed cross sectional shape which is formed by a side sill inner and a side sill outer, the side sill inner includes an upper inner member and a lower inner member which are separate members, a tensile strength of the upper inner member being higher than a tensile strength of the lower inner member, the side sill has. At a front portion of the side sill, a deforming portion which is to be deformed by a load applied in a longitudinal direction of the side sill is provided. The upper inner member and the lower inner member are connected together by a reinforcing member which is disposed close to the deforming portion and in the closed cross section.

8 Claims, 7 Drawing Sheets

SIDE BODY STRUCTURE FOR VEHICLE

CROSS REFERENCES TO RELATED APPLICATIONS

The present application claims priority under 35 U.S.C. §119 to Japanese Patent Application No. 2012-086488, filed Apr. 5, 2012, entitled "Side Body Structure for Vehicle." The contents of this application are incorporated herein by reference in their entirety.

TECHNICAL FIELD

The present disclosure relates to a side body structure for a vehicle which absorbs an impact load applied to the front of the vehicle, by a side sill which constitutes a lower part of the side body of the vehicle.

BACKGROUND

In some side body structures, the side sill inner is separated into two parts in order to absorb an impact of a side collision and reduce the weight of the vehicle. For example, the upper side sill inner is given a thickness which is greater than the thickness of the lower side sill inner, and the upper side sill inner, the outer end of a dashboard cross member, and the lower end of a front pillar are connected together using a cassette (for example, see Japanese Patent No. 4438416).

However, with the conventional technology (Japanese Patent No. 4438416), when a collision occurs at the front of a vehicle, particularly when a narrow offset collision occurs at one end of the front of the vehicle, a pole such as a guardrail support post after the collision moves in on the outside of the front side frame and toward the front wheel, or the front wheel is moved backward and an impact is applied to the front end of the side sill, and thus degree of deformation of the side sill in the longitudinal direction may increase.

SUMMARY

The present disclosure describes a side body structure for a vehicle, in which when an impact (load) is applied to the end of a side sill at a narrow offset collision, the impact is absorbed by the deformation of the front part of the side sill.

In order to solve the above-described problem, a first aspect of the present embodiment provides a side body structure for a vehicle, including a side sill including a closed cross sectional shape formed by a side sill inner member and a side sill outer member. The side sill inner member includes an upper inner member and a lower inner member, the upper inner member and the lower inner member being separate members. A tensile strength of the upper inner member is higher than a tensile strength of the lower inner member. The side sill includes a reinforcing member therein between a front end thereof and a rear end thereof such that a deforming portion of the side sill is defined ahead of the reinforcing member, the deforming portion is to be deformed by a load applied in a longitudinal direction of the side sill. The upper inner member and the lower inner member are connected together by the reinforcing member. Thus, when a collision (narrow offset collision) occurs at the front, for example, at the left end of the front of the vehicle and a load is applied thereto, a deforming portion disposed at the front of the side sill is deformed upward. Consequently, an impact can be absorbed by the structure between the front of the side sill and the reinforcing member, and thus it is possible to reduce deformation of a portion of the side sill located at the rear of the reinforcing member.

In a second aspect of the present embodiment, the upper inner member includes an upper flange joined to the side sill outer, and a first ridge line portion and a second ridge line portion each formed by bending the upper inner member. The lower inner member includes a lower flange joined to the side sill outer. The side sill inner includes a hat-shaped cross section including an opening facing toward an outside of a vehicle cabin. The upper inner member is formed by a hot-press and the lower inner member is formed by a cold-press. Thus, in contrast to integrated side sill which is obtained by performing plastic working on an ordinary steel plate, the side sill of the present disclosure can be made light by using a steel plate having a reduced thickness, which is formed by hot-press (for example, high-tensile steel sheet having a tensile strength of 1500 MPa). When a collision (narrow offset collision) occurs at the front, for example, at the left end of the front of the vehicle and a load is applied thereto, the load is mostly transferred to a first ridge line portion and a second ridge line portion of the upper inner member which has a high tensile strength. Consequently, a load is unevenly applied to the upper side of the side sill with respect to the axis of the side sill inner in the longitudinal direction, and thus the side sill can be bent upward around an initial bend point which is the terminating end of the deforming portion.

In a third aspect of the present embodiment, a floor panel of the under body is joined to the lower inner member. Thus, even when the side sill is separated into halves and two types of steel plates having different tensile strengths are used, the steel plate used for the lower inner member and the steel plate used for the floor panel are composed of the same material, and thus in contrast to the case where different materials are used, welding operation is easily carried out, and a sufficient weld strength can be achieved.

In a fourth aspect of the present embodiment, the upper inner member includes the upper joint flange jointed to the side sill outer, an upper inner ceiling portion contiguous to the upper joint flange via the first ridge line portion, and an upper inner side wall contiguous to the upper inner ceiling portion via the second ridge line portion, the lower inner member includes the lower joint flange contiguous to the side sill outer, a lower inner bottom contiguous to the lower joint flange, and a lower inner side wall contiguous to the lower inner bottom, and the reinforcing member is jointed to at least the upper inner ceiling portion and the upper inner side wall of the upper inner member, and to at least the lower inner bottom and the lower inner side wall of the lower inner member. Thus, for a load applied from the end of the side sill, the reinforcing member reduces the deformation of the side sill inner which causes the opening of the side sill inner to increase, and the load is concentrated on the joint portion between the reinforcing member and the side sill inner. Consequently, when a load applied at the time of a narrow offset collision is preferentially transferred to the upper inner member as already described, the upper inner member starts to bend at the position where the reinforcing member is disposed, while a portion of the upper inner member is bent upward, the portion being located ahead (deforming portion) of the position where the reinforcing member is disposed. Therefore, the deforming portion of the side sill is easily bent.

In a fifth aspect of the present embodiment, in the upper inner member, the upper joint flange joined to the side sill outer and the first ridge line portion contiguous to the upper joint flange are offset toward inside of the vehicle cabin by a certain distance at the deforming portion. Thus, the bent corner formed by the offset is substantially the same as the initial bend point of the deforming portion, and the load applied at the time of a narrow offset collision is concentrated on the bent corner, and thus the deforming portion is easily bent upward around the initial bend point, and the impact at the time of a narrow offset collision is easily absorbed.

BRIEF DESCRIPTION OF THE DRAWINGS

The advantages of the disclosure will become apparent in the following description taken in conjunction with the following drawings.

DETAILED DESCRIPTION

Hereinafter, an embodiment of the present disclosure will be described in detail.

Embodiment

Figure 1:
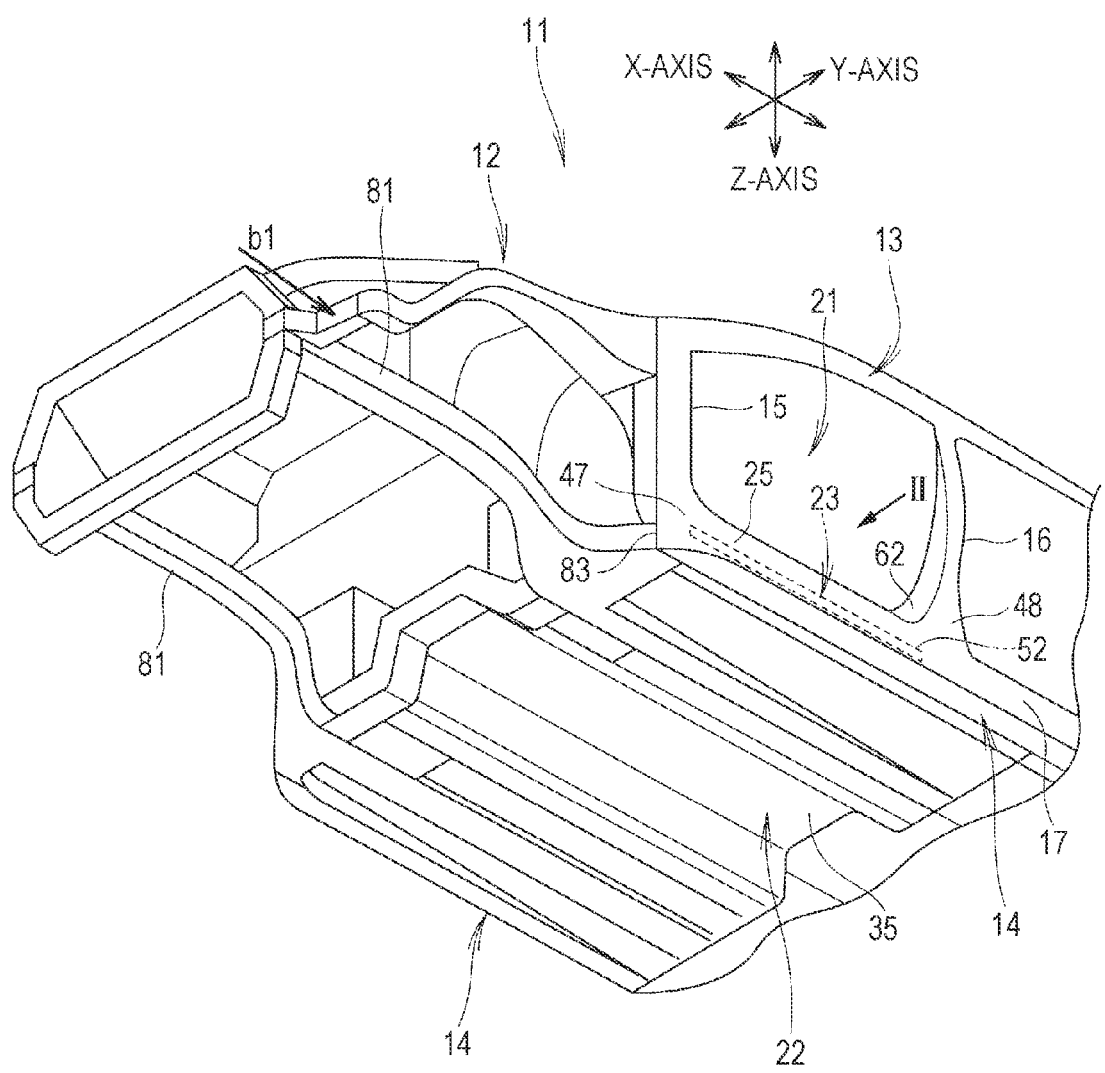
FIG. 1 is a perspective view of front bottom of a side body structure for a vehicle according to an embodiment.
Figure 2:
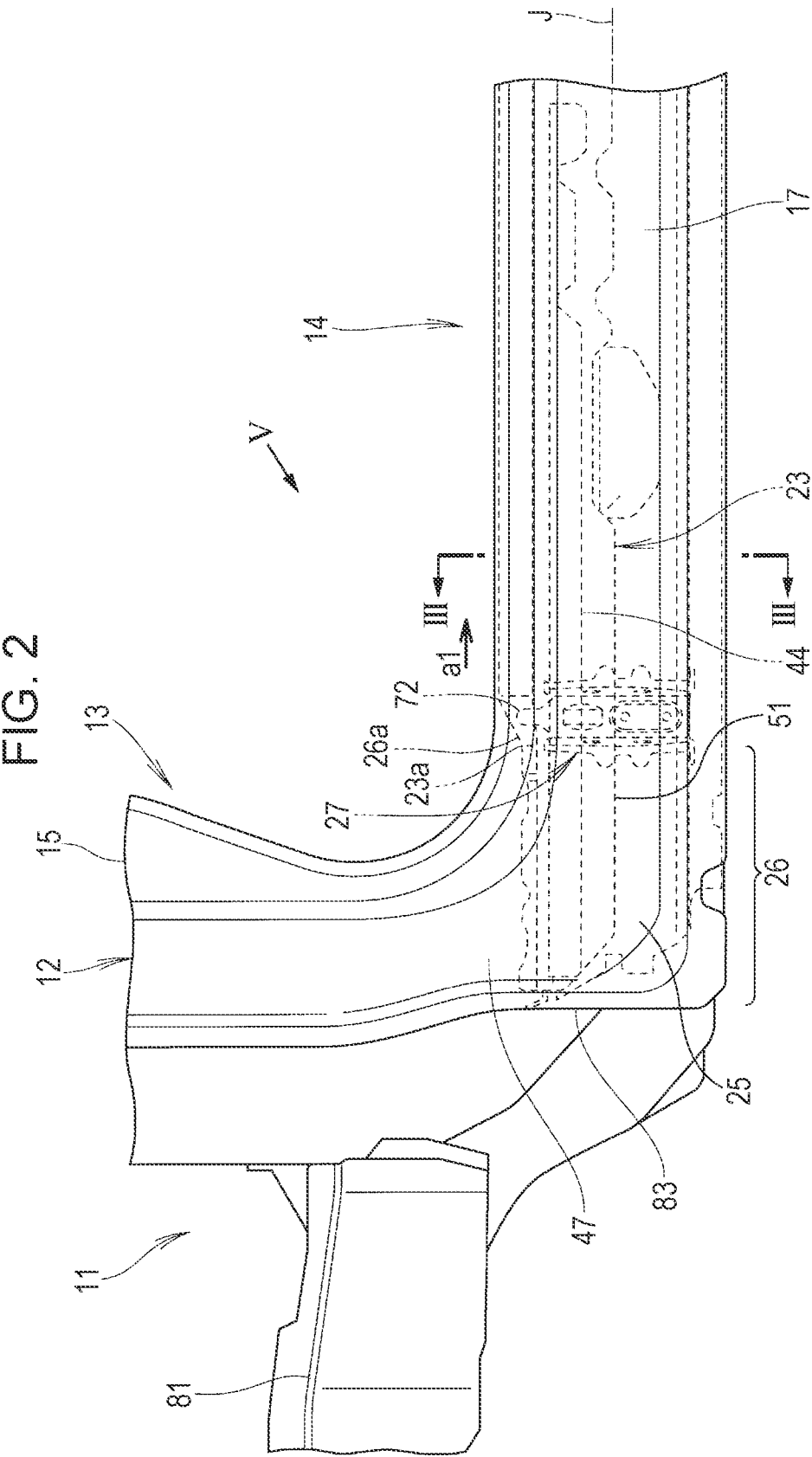
FIG. 2 is a view in the direction of an arrow II in FIG. 1.

As illustrated in FIGS. 1 and 2, a vehicle 11 adopts a side body structure according to an embodiment to a vehicle body 12. The vehicle body 12 includes right and left side sills 14 in right and left of side bodies 13, a front pillar 15 and a center pillar 16 which are provided upright for each of the right and left side sills 14.

Figure 3:
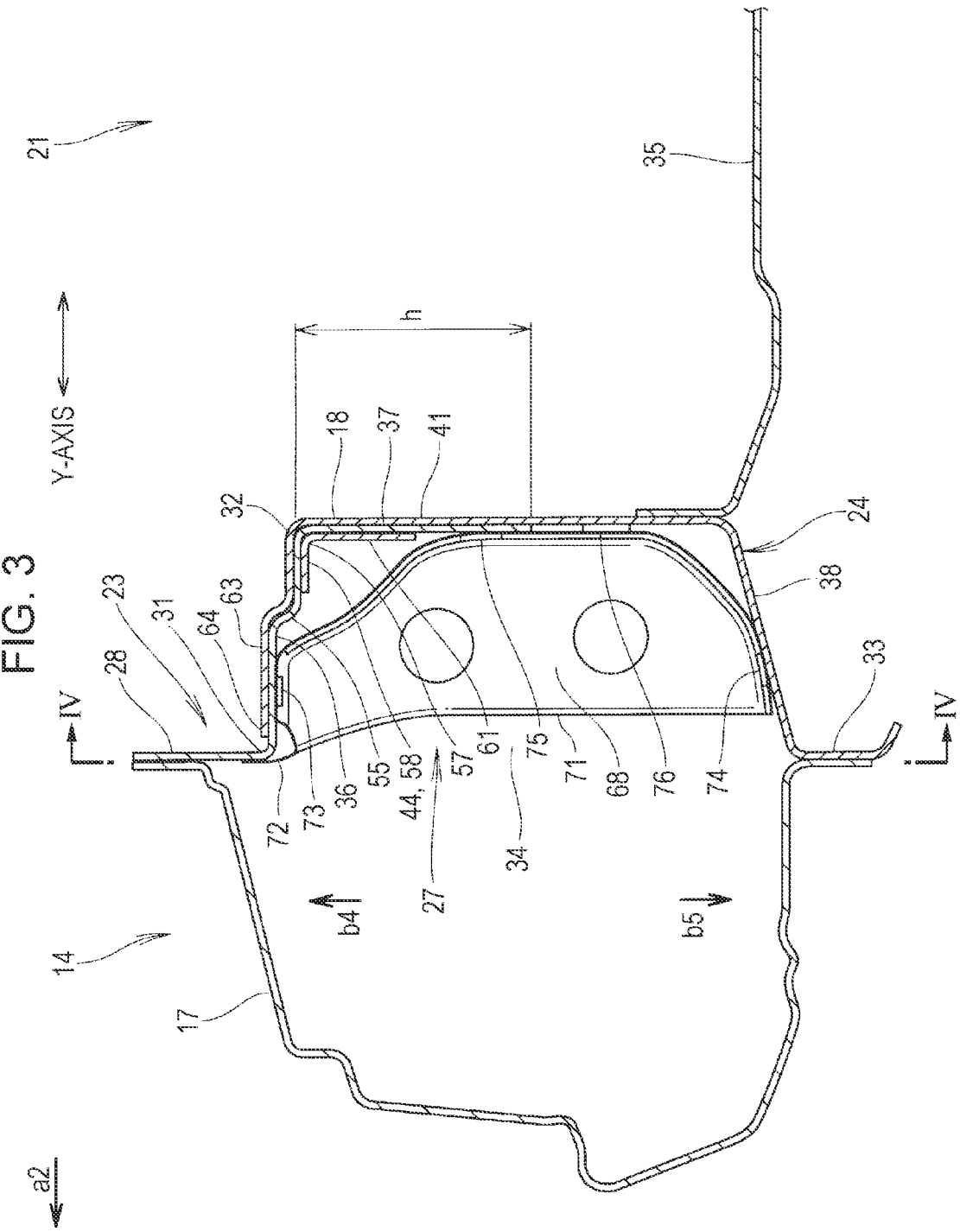
FIG. 3 is a cross-sectional view taken along a line III-III in FIG. 2.

Each side sill 14 is formed by connecting a side sill inner 18 to a side sill outer 17 as illustrated in FIG. 3. The side sill 14 is included in the side body structure according to the embodiment.

Next, the main configuration of the side body structure according to the embodiment will be described with reference to FIGS. 1 to 7. The side body structure for the vehicle 11 includes the right and left of side bodies 13 which are provided upright at the left and right ends of an under body 22 which serves as the floor of a vehicle cabin 21. The side sill 14 which serves as the lower end of the side body 13 has a closed cross sectional shape which is formed by the side sill inner 18 and the side sill outer 17.

The side sill inner 18 is separated into an upper inner member 23 and a lower inner member 24, that is, separated into upper and lower members (Z-axis direction), and the tensile strength of the upper inner member 23 is made greater than the tensile strength of the lower inner member 24.

The side sill 14 has a deforming portion 26 which is deformed by a load which is applied to a front portion 25 of the side sill 14 in the longitudinal direction (X-axis direction) of the side sill 14. The upper inner member 23 and the lower inner member 24 are connected together by a reinforcing member 27 which is disposed at the rear (in the direction of arrow a1) of and close to the deforming portion 26, and in a closed cross section.

The upper inner member 23 is formed by a hot-press, and includes an upper joint flange (upper joint flange for upper inner) 28 which is joined to the side sill outer 17, and at least a first ridge line portion 31 and a second ridge line portion 32 which are in continuous with the upper joint flange 28 and formed by bending the upper inner member 23.

The lower inner member 24 is formed by a cold-press, and includes a lower joint flange (lower joint flange for lower inner) 33 which is joined to the side sill outer 17. As illustrated in FIG. 3, the side sill inner 18 has a hat-shaped cross section and an opening 34 which faces toward outside (in the direction of arrow a2) of the vehicle cabin 21. The lower inner member 24 is joined to a floor panel 35 of the under body 22 (FIG. 3).

The upper inner member 23 includes the upper joint flange 28 joined to the side sill outer 17, an upper inner ceiling portion 36 in continuous with the upper joint flange 28 via the first ridge line portion 31, and an upper inner side wall 37 in continuous with the upper inner ceiling portion 36 via the second ridge line portion 32.

As illustrated in FIG. 3, the lower inner member 24 includes the lower joint flange (lower joint flange for lower inner) 33 joined to the side sill outer 17, a lower inner bottom 38 in continuous with the lower joint flange 33, and a lower inner side wall 41 in continuous with the lower inner bottom 38.

The reinforcing member 27 is jointed to at least the upper inner ceiling portion 36 and the upper inner side wall 37 of the upper inner member 23, and to at least the lower inner bottom 38 and the lower inner side wall 41 of the lower inner member 24.

Furthermore, in the upper inner member 23, the upper joint flange 28 joined to the side sill outer 17 and the first ridge line portion 31 contiguous to the upper joint flange 28 are offset toward inside of the vehicle cabin 21 by a desired distance B at the deforming portion 26. The above offset region is denoted as a bent corner 23a.

Next, the upper inner member 23, an upper inner reinforcing frame 44 stacked on the upper inner member 23, the lower inner member 24, the deforming portion 26, and the reinforcing member 27 will be described in detail.

The upper inner member 23 is obtained by hot-press using a high tensile steel sheet. The tensile strength of the upper inner member 23 is, for example, 1500 MPa which is achieved by a high tensile steel sheet.

Figure 4:
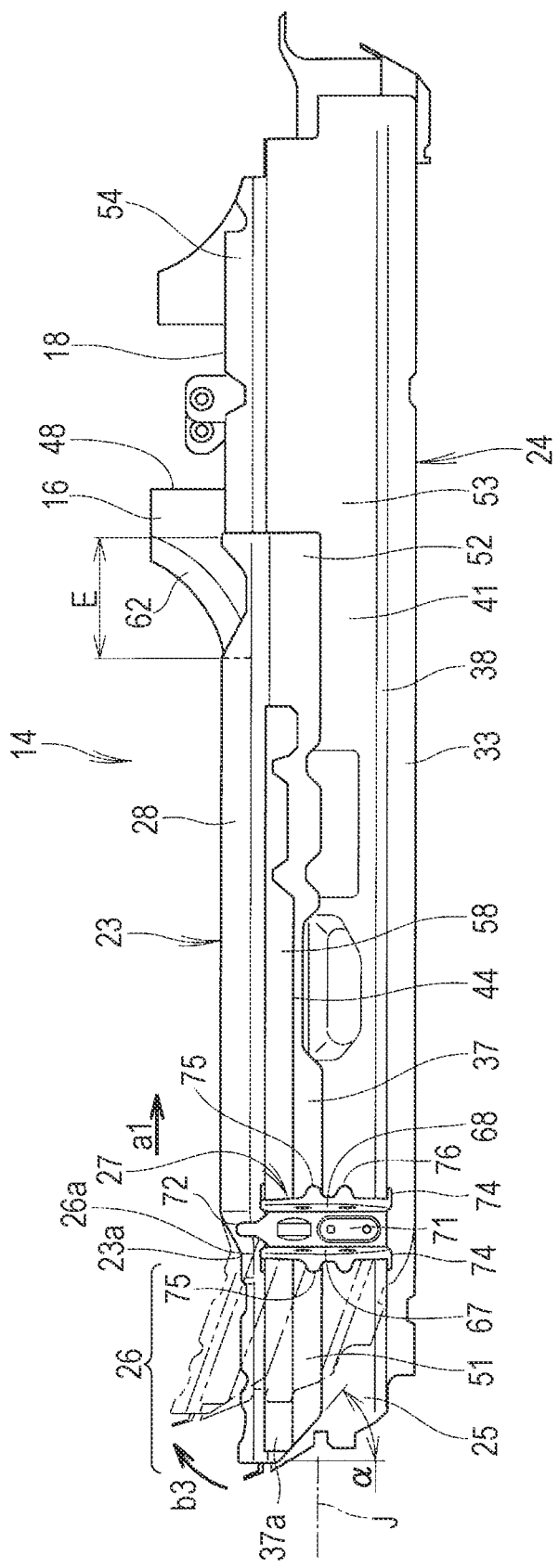
FIG. 4 is a cross-sectional view taken along a line IV-IV in FIG. 3, and is also a diagram illustrating an impact absorption mechanism when a narrow offset collision occurs with the side body structure.
Figure 5:
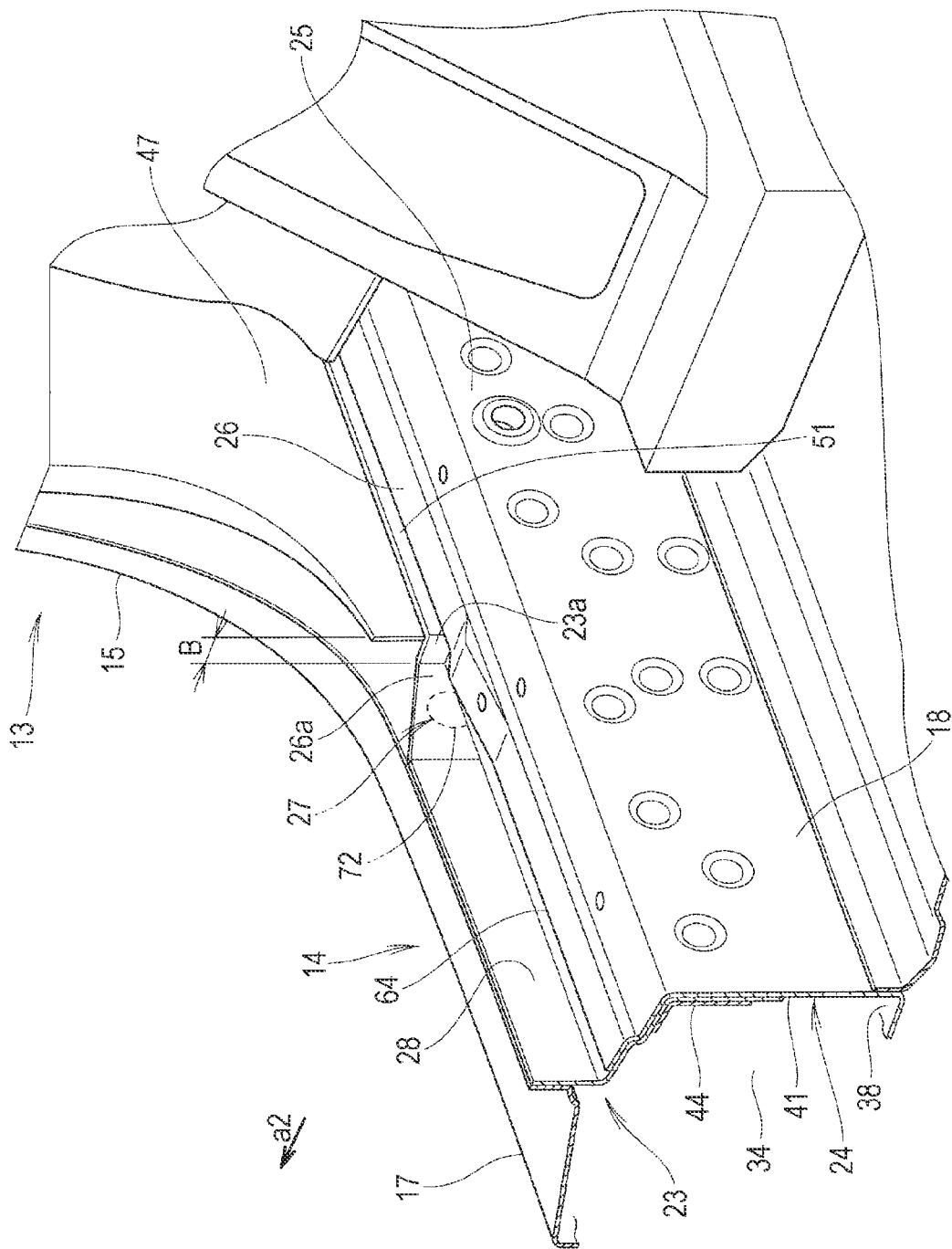
FIG. 5 is a view in the direction of an arrow V in FIG. 2.
Figure 6:
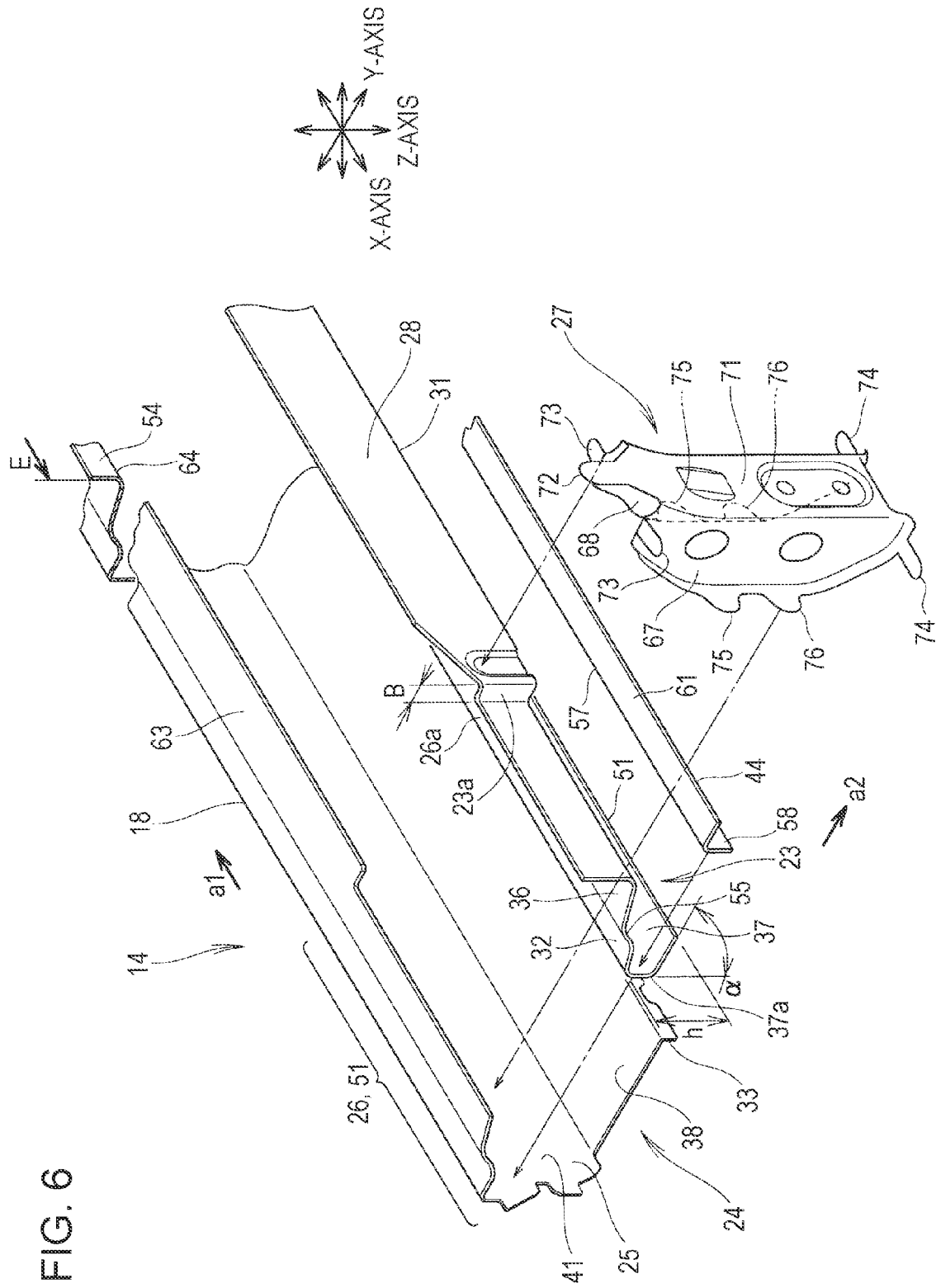
FIG. 6 is an exploded view of a side sill inner according to the embodiment.
Figure 7:
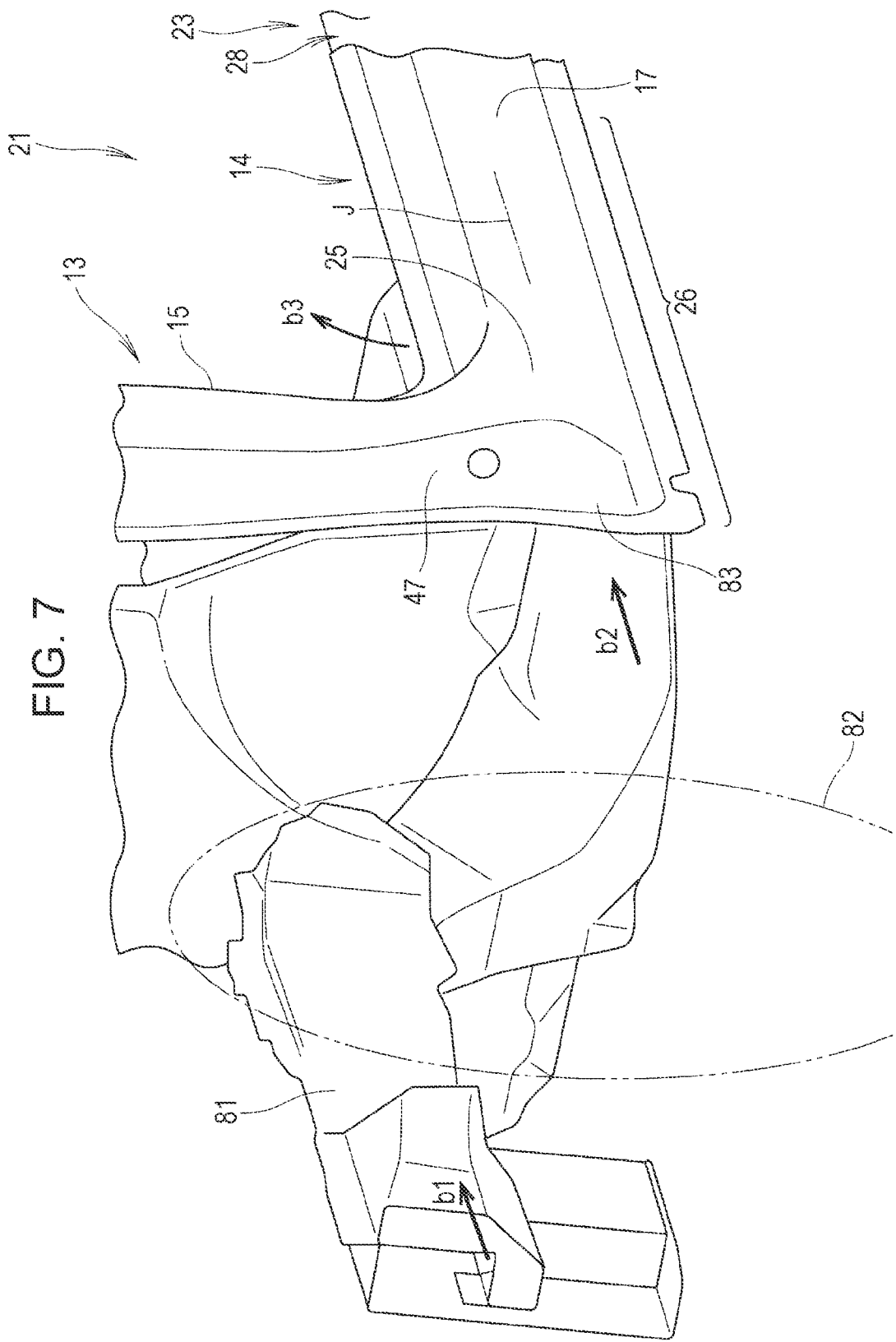
FIG. 7 is a diagram illustrating an impact absorption mechanism when a narrow offset collision occurs with the side body structure according to the embodiment.

The upper inner member 23 extends from a lower portion 47 of the front pillar 15 to a lower portion 48 of the center pillar 16. As illustrated in FIG. 4, a front joint portion 51 joined to the lower portion 47 of the front pillar 15 is formed, and a rear joint portion 52 connected to the lower portion 48 of the center pillar 16 is formed.

The upper joint flange (upper joint flange for upper inner) 28 of the rear joint portion 52 is connected to an upper joint flange of the lower inner 54 of the lower inner member 24 with an overlapping distance E (FIG. 4).

The upper inner side wall 37 of the upper inner member 23 has a height h which is approximately 50% of the height of the lower inner side wall 41 of the lower inner member 24. Consequently, in contrast to the case where the side sill inner 18 of the side sill 14 is formed with an ordinary steel plate, the strength of the side sill 14 is improved while suppressing an increase in the weight of the side sill 14. A tapered portion 37a is formed with a cutting angle (FIG. 4, FIG. 6) at the end of the upper inner side wall 37.

In the upper inner ceiling portion 36 of the upper inner member 23, a stepped section 55 is formed at the center of the width, i.e., at the center between the first ridge line portion 31 and the second ridge line portion 32. Therefore, the strength of the side sill 14 can be improved and an increase in the weight of the side sill 14 can be reduced.

The upper inner reinforcing frame 44 is joined to the inner surface of the second ridge line portion 32 of the upper inner member 23 in an overlapping manner.

The upper inner reinforcing frame 44 is obtained by performing plastic processing on e.g., a high tensile steel sheet to produce an L-shaped cross section. The upper inner reinforcing frame 44 extends from the lower portion 47 of the front pillar 15 to immediately before the lower portion 48 of the center pillar 16. By placing a corner (ridge line) 57 of the upper inner reinforcing frame 44 on the second ridge line portion 32 of the upper inner member 23, a first plate portion 58 and a second plate portion 61 which are contiguous to the corner 57 are placed on the upper inner member 23.

The first plate portion 58 has a width which is approximately 30% of the width of the upper inner ceiling portion 36, and the second plate portion 61 has a height which is approximately 20% of the height of the lower inner side wall 41 of the lower inner member 24. Consequently, the strength of the side sill 14 can be improved and an increase in the weight of the side sill 14 can be reduced.

The lower inner member 24 is obtained by performing plastic processing on an ordinary steel plate. The lower inner member 24 is in a divided form from the front end of the lower inner member 24 to a front portion 62 of the center pillar 16 in the longitudinal direction (the fore-and-aft direction of the vehicle). In the remaining portion of the lower inner member 24 in the longitudinal direction, the upper joint flange for lower inner 54, which is not in a divided form, is formed.

On the other hand, the lower inner member 24 extends to a lower inner ceiling portion 63 in the width direction (Y-axis direction) and the vertical direction (Z-axis direction) which are perpendicular to the longitudinal direction (X-axis direction). The above extension to the lower inner ceiling portion 63 indicates that the lower inner ceiling portion 63 is divided at a corner 64 to be left, the corner 64 being formed by the lower inner ceiling portion 63 facing upward and contiguous to the lower inner side wall 41, and the upper joint flange for lower inner 54 joined to the side sill outer 17.

The deforming portion 26 includes the front portion 25 of the side sill 14, and also serves as a front pillar joint part to which the lower portion 47 of the front pillar 15 is joined. The length of the deforming portion 26 is defined in the direction extending rearward from the end (starting end) of the side sill 14, and is somewhat longer than the length of the lower portion 47 of the front pillar 15. The reinforcing member 27 is joined to the vicinity of a terminating end 26a of the deforming portion 26.

The reinforcing member 27 has a hat-shaped cross section, and substantially partitions the inside of the side sill inner 18. As seen from the vehicle side view (eye point of FIGS. 2 and 4), the reinforcing member 27 includes a reinforcing front wall portion 67 which is perpendicular to the longitudinal direction of the side sill inner 18 (X-axis direction), a reinforcing rear wall portion 68 rearwardly spaced apart from the reinforcing front wall portion 67, and a reinforcing side portion 71 which is contiguous to the reinforcing front wall portion 67 and the reinforcing rear wall portion 68.

The reinforcing side portion 71 is located at the opening 34 of the side sill inner 18, and is disposed at the boundary between the side sill inner 18 and the side sill outer 17. An upper joint piece 72 extending from the reinforcing side portion 71 is joined to the upper joint flange 28 of the upper inner member 23.

On the other hand, the reinforcing front wall portion 67 allows an upper joint piece 73 extending from the reinforcing front wall portion 67 to be joined to the upper inner ceiling portion 36 of the upper inner member 23. In addition, a lower joint piece 74 extending from the reinforcing front wall portion 67 is joined to the lower inner bottom 38 of the lower inner member 24.

Furthermore, a first center joint piece 75 extending from the reinforcing front wall portion 67 is joined to the upper inner side wall 37 of the upper inner member 23. A second center joint piece 76 extending from the reinforcing front wall portion 67 is joined to the lower inner side wall 41 of the lower inner member 24. The reinforcing rear wall portion 68 of the reinforcing member 27 is substantially symmetrical to the reinforcing front wall portion 67, and thus description is omitted.

Next, the effect of the side body structure for the vehicle 11 will be described. In the side body structure, when a load is applied from a front side frame 81 to the outer side of the vehicle 11 in a narrow offset collision as indicated by arrow b1 illustrated in FIG. 1, a front wheel 82 is pushed backward as indicated by arrow b2 illustrated in FIG. 7, and collides with a front end 83 of the side sill 14.

As illustrated in FIG. 4, the deforming portion 26 provided at the front portion 25 of the side sill 14 is bent upward by the load of the impact as indicated by arrow b3 and illustrated by a chain double-dashed line, and thus the impact can be absorbed by the structure between the front portion 25 of the side sill 14 and the reinforcing member 27. Thus, it is possible to reduce deformation of a portion of the side sill 14, the portion being located at the rear of the position where the reinforcing member 27 is disposed.

When a narrow offset collision occurs and a load is applied, the load is mostly transferred to the first ridge line portion 31 and the second ridge line portion 32 of the upper inner member 23 which has a high tensile strength. Consequently, a load is unevenly applied to the upper side of the side sill 14 with respect to axis J of the side sill inner 18 in the longitudinal direction, and thus the side sill 14 can be bent upward around an initial bend point which is the terminating end 26a of the deforming portion 26 as indicated by arrow b3.

In addition, for a load applied from the end (front end 83) of the side sill 14, the reinforcing member 27 reduces the deformation (the directions of arrow b4 and arrow b5 in FIG. 3) of the side sill inner 18 which causes the opening of the side sill inner 18 to increase, and the load is concentrated on the joint portion between the reinforcing member 27 and the side sill inner 18. Consequently, when a load applied at the time of a narrow offset collision is preferentially transferred to the upper inner member 23 as already described, the upper inner member 23 starts to bend at the position (terminating end 26a) where the reinforcing member 27 is disposed, while a portion (deforming portion 26) of the upper inner member 23 is bent upward, the portion being located ahead of the position where the reinforcing member 27 is disposed. Therefore, the deforming portion 26 of the side sill 14 is easily bent.

Because a load applied at the time of an offset collision is concentrated on the bent corner 23a in the upper inner member 23, the deforming portion of the side sill is easily bent, and thus the impact at the time of a narrow offset collision can be easily absorbed.

In the above side body structure, the action and effect of the left side sill 14 have been described, however, the right side sill 14 also provides substantially the same action and effect as the left side sill 14. While embodiments of the present disclosure have been particularly shown and described with reference to exemplary embodiments thereof, it will be understood by those of ordinary skill in the art that various changes in form and details may be made therein without departing from the spirit and scope of the present invention as defined by the following claims.

The side body structure for a vehicle of the present disclosure is suitable for a vehicle.

We claim:

1. A side body structure for a vehicle comprising:
    a side sill including a closed cross sectional shape formed by a side sill inner member and a side sill outer member,
    wherein the side sill inner member includes an upper inner member and a lower inner member, the upper inner member and the lower inner member being separate members,
    a tensile strength of the upper inner member is higher than a tensile strength of the lower inner member,
    the side sill includes a reinforcing member therein between a front end thereof and a rear end thereof such that a deforming portion of the side sill is defined ahead of the reinforcing member, the deforming portion being to be deformed by a load applied in a longitudinal direction of the side sill, and
    the upper inner member and the lower inner member are connected together by the reinforcing member.

2. The side body structure for a vehicle according to claim 1,
    wherein the upper inner member includes an upper flange joined to the side sill outer, and a first ridge line portion and a second ridge line portion each formed by bending the upper inner member,
    the lower inner member includes a lower flange joined to the side sill outer, and
    the side sill inner includes a hat-shaped cross section including an opening facing toward an outside of a vehicle cabin.

3. The side body structure for a vehicle according to claim 1,
    wherein a floor panel of an under body of a vehicle cabin is joined to the lower inner member.

4. The side body structure for a vehicle according to claim 1,
    wherein the upper inner member includes a upper flange joined to the side sill outer, an upper inner ceiling portion provided continuously from the upper flange via a first ridge line portion, and an upper inner side wall provided continuously from the upper inner ceiling portion via a second ridge line portion,
    the lower inner member includes a lower flange joined to the side sill outer, a lower inner bottom portion provided continuously from the lower flange, and a lower inner side wall provided continuously from the lower inner bottom portion, and
    the reinforcing member is at least connected to the upper inner ceiling portion, the upper inner side wall, the lower inner bottom portion and the lower inner side wall.

5. The side body structure for a vehicle according to claim 1,
    wherein the upper inner member includes an upper flange joined to the side sill outer, and a first ridge line portion formed by bending the upper inner member,
    wherein the upper flange and the first ridge line portion are offset toward inside of a vehicle cabin by a certain distance at or near the deforming portion.

6. The side body structure for a vehicle according to claim 2,
    wherein the upper inner member is formed by a hot-press and the lower inner member is formed by a cold-press.

7. The side body structure for a vehicle according to claim 1,
    wherein the upper inner member and the lower inner member are arranged in the deforming portion such that collision load input from a front end of the side sill is transmitted more through the upper inner member toward the reinforcing member than the lower inner member.

8. The side body structure for a vehicle according to claim 1,
    wherein the upper inner member further includes a longitudinally extending second reinforcing member.

* * * * *